United States Patent [19]
Yamada et al.

[11] Patent Number: 5,504,803
[45] Date of Patent: Apr. 2, 1996

[54] METHOD FOR AUTOMATIC MODE SELECTION FOR A DUAL-MODE TELEPHONE HANDSET FOR USE IN A CELLULAR MOBILE TELEPHONE SYSTEM AND IN A WIRELESS TELEPHONE SYSTEM

[75] Inventors: Jun Yamada, Yokohama, Japan; Kevin Callahan, Norcross; Charles A. Jacobs, Woodstock, both of Ga.

[73] Assignee: Matsushita Electric Industrial Co., Ltd., Osaka, Japan

[21] Appl. No.: 100,913

[22] Filed: Aug. 2, 1993

Related U.S. Application Data

[63] Continuation-in-part of Ser. No. 796,808, Nov. 25, 1991, abandoned, Ser. No. 956,337, Oct. 5, 1992, abandoned, and Ser. No. 959,722, Oct. 13, 1992.

[51] Int. Cl.⁶ .................................................. H04Q 7/32
[52] U.S. Cl. ............................ 379/59; 379/61; 455/33.1; 455/33.2; 455/34.1; 455/542
[58] Field of Search .............................. 379/59, 60, 61; 455/33.1, 33.2, 34.1, 54.2

[56] References Cited

U.S. PATENT DOCUMENTS

| | | | |
|---|---|---|---|
| 4,768,220 | 8/1988 | Yoshihara et al. | |
| 4,790,000 | 12/1988 | Kinoshita | 379/59 |
| 4,792,984 | 12/1988 | Matsuo | |
| 4,850,033 | 7/1989 | Eizenhofer et al. | |
| 5,040,238 | 8/1991 | Comroe et al. | |
| 5,056,109 | 10/1991 | Gilhousen et al. | |
| 5,067,147 | 11/1991 | Lee | |
| 5,101,500 | 3/1992 | Marui | |
| 5,127,042 | 6/1992 | Gillig et al. | |
| 5,193,101 | 3/1993 | McDonald et al. | |
| 5,193,109 | 3/1993 | Lee | |
| 5,197,093 | 3/1993 | Knuth et al. | 379/61 |
| 5,203,015 | 4/1993 | George | 455/34.1 |
| 5,212,805 | 5/1993 | Comroe et al. | |
| 5,218,618 | 6/1993 | Sagey | 375/1 |
| 5,237,603 | 8/1993 | Yamagara et al. | 379/61 |
| 5,243,641 | 9/1993 | Evans et al. | 379/61 |
| 5,257,400 | 10/1993 | Yoshida | 455/33.1 |
| 5,257,401 | 10/1993 | Dahlin et al. | 455/33.2 |
| 5,260,988 | 11/1993 | Schellinger et al. | 379/59 |
| 5,353,341 | 10/1994 | Gillis et al. | 379/61 |
| 5,373,547 | 12/1994 | Patsiokas et al. | 379/61 |
| 5,379,451 | 1/1995 | Nakagoshi et al. | 455/54.2 |

FOREIGN PATENT DOCUMENTS

| | | |
|---|---|---|
| 0418096A2 | 9/1990 | European Pat. Off. |
| 2234649 | 2/1991 | United Kingdom |
| 2242806 | 10/1991 | United Kingdom |
| 2252699 | 8/1992 | United Kingdom |
| 2253968 | 9/1992 | United Kingdom |
| 2255474 | 11/1992 | United Kingdom |
| 2255476 | 11/1992 | United Kingdom |
| WO86/06915 | 11/1986 | WIPO |

OTHER PUBLICATIONS

Steele, "The Cellular Environment of Lightweight Handheld Portables", IEEE, 1989.

*Primary Examiner*—Dwayne D. Bost
*Assistant Examiner*—William Cumming
*Attorney, Agent, or Firm*—Amster, Rothstein & Ebenstein

[57] ABSTRACT

A personal communications system permits a wireless handset to access either a cellular mobile telephone system (CMTS) or a private wireless telephone system (WTS) which shares the CMTS frequency band by utilizing those CMTS channels which are idle in the area serviced by the WTS. The wireless handset automatically selects between the WTS and CMTS operating modes by maintaining a list of previously accessed WTS control channels and periodically scanning that list for a WTS available at the location of the handset. If a WTS control channel is not found in that list, then the handset periodically scans all possible WTS control channels for the purpose of registering on an available WTS. If no WTS is found, then the handset switches to CMTS mode. The scanning methodology permits the wireless handset to rapidly lock on to an available WTS which will provide service to the handset, so as to reduce the possibility of the wireless handset missing incoming paging signals.

13 Claims, 11 Drawing Sheets

FIG. 7 INITIAL CACHE SCAN

INITIAL FULL SCAN

METHOD FOR AUTOMATIC MODE SELECTION FOR A DUAL-MODE TELEPHONE HANDSET FOR USE IN A CELLULAR MOBILE TELEPHONE SYSTEM AND IN A WIRELESS TELEPHONE SYSTEM

This application is a continuation-in-part of U.S. patent application Ser. No. 07/796,808, filed Nov. 25, 1991, now abandoned; U.S. patent application Ser. No. 07/956,337, filed Oct. 5, 1992, now abandoned; and U.S. patent application Ser. No. 07/959,722, filed Oct. 13, 1992, now allowed; the disclosures of which are incorporated herein by reference.

The present invention relates to a personal communication system ("PCS") which adds wireless functionality to a private telephone system (e.g. a private branch exchange ("PBX") or "CENTREX" telephone system), and permits a wireless PCS handset to act as either a PBX extension telephone set or as a conventional cellular mobile telephone. The appropriate mode may be selected either manually or automatically by the PCS handset, with automatic selection being accomplished by the PCS handset monitoring the radio frequency environment for control signals present in the operating area of the PCS.

Existing cellular mobile telephone systems ("CMTS") used in a microcell configuration are not suitable for use as a private wireless telephone system, since such prior art cellular systems cannot limit access to a restricted number of authorized users. In the absence of such restricted access, a subscriber of a CMTS would be able to operate on the private telephone system. In addition, the cellular control and switching equipment available to prior art cellular systems is geared for large scale systems and therefore not suited, either in terms of complexity or cost, to smaller scale PBX or "CENTREX" applications.

The PCS system disclosed herein is designed for businesses who wish to allow their employees to move freely within company facilities using a battery operated wireless PCS handset which can function within a local area on a private wireless telephone system ("WTS"), such as a PBX or "CENTREX" system, and externally on the CMTS.

In particular, the present invention is directed to apparatus and methods by which such PCS handset can rapidly select between the CMTS and the WTS enabled by the PCS, so as to minimize the chance of the PCS handset missing incoming telephone calls. The present invention is also directed to apparatus and methods by which the PCS handset, when set to automatically select between the CMTS and WTS modes, preferredly attempts to maintain operation in an available WTS for as long as possible. Further, when the PCS handset is in the WTS mode and enters an area that is covered by another WTS in which the PCS handset is authorized to operate, the apparatus and methods disclosed herein enable the PCS handset to remain under control of the WTS in which it is currently operating, even though it receives control signals of higher signal strength from control channels used by the other WTS.

BACKGROUND OF THE INVENTION

Over the past decade, as telephone users demand more and more capabilities from telephone equipment, various forms of wireless telephone systems have become available. For example, wireless home systems are now available in which a low power base station directly connects to the public switched telephone network ("PSTN") in place of a standard telephone set and provides limited area wireless capability within a home. In addition, cellular mobile telephone use, widely introduced about ten years ago, continues its rapid growth and, in most large metropolitan areas, the 800–900 MHz spectrum assigned to the CMTS has become exceedingly crowded.

The notion of "personal" communications, by which one is always able to reach an individual regardless of his or her location, has become a popular goal of telecommunications companies, and various multi-functional systems have been developed with that objective in mind. For example, U.S. Pat. No. 4,989,230 describes a telephone which has two separate transceivers for accessing the separate frequency bands used by either a wireless home telephone system or a CMTS. U.S. Pat. No. 4,790,000 describes a private wireless system which shares the same frequency band as a CMTS by fixedly preselecting for use by the private wireless system those channels of the CMTS which will not interfere with the CMTS in the local area serviced by the private system.

In the PCS further described below and in the related patent applications whose disclosures are incorporated herein by reference, the PCS continually scans all CMTS voice channels and dynamically selects and maintains a pool of those CMTS voice channels which are idle within the local area serviced by the PCS. These idle channels are made available to the WTS for use as control or voice channels of the WTS.

A number of unique problems arise in implementing the functionalities desired for the PCS handset as it moves around within the WTS as a result of its sharing the same frequency spectrum used by the CMTS and other WTS systems which may be operating in the same local area.

For example, as a consequence of the dynamic scanning and channel allocation process, the WTS control channels may, in principle, be any of the more than 400 channels which are available as CMTS voice channels (on either the A or B side of the cellular spectrum). When the PCS handset attempts to enter the WTS operating mode, it must perform a channel scan to find the appropriate control channel of a WTS in which it may register. However, always scanning all potential WTS control channels is not feasible since the scan time would be inordinately long and paging signals to the PCS handset that occur during the scanning process, indicative of an incoming call, would be missed by the PCS handset, resulting in an unacceptable level of lost incoming phone calls. Accordingly, it is necessary for the PCS handset to implement a scanning procedure which efficiently finds the accessible WTS control channels in a sufficiently short time so as not to lose incoming paging signals.

Further, since there might be many overlapping microcells corresponding to other WTS systems which might be operating within the same locality, once the PCS handset has located the control channel of the WTS system to which it is permitted access, it is desirous that the PCS handset remain tuned to that WTS system even if an adjacent WTS control channel of greater signal strength originating from a different WTS system is received by the PCS handset. In the invention disclosed herein, the scanning procedure implemented by the PCS handset provides this and other capabilities.

SUMMARY OF THE INVENTION

It is an object of the present invention to provide a PCS handset which can automatically select either a CMTS or WTS operating mode and rapidly access an available WTS system so as not to miss incoming paging signals to the handset.

It is another object of the present invention to provide a PCS handset which is capable of operating within a CMTS or a WTS, and which preferredly automatically enters the WTS mode whenever it locates an accessible WTS system.

It is a further object of the present invention to provide a PCS handset which remains in operation in a currently accessed WTS system without switching to another WTS system having a stronger signal.

It is a still further object of the present invention to provide methods for implementing the above functionalities in a PCS handset.

These and other objects of the invention are provided by a dual-mode telephone handset which is adapted to operate in a CMTS and in at least one WTS which shares the CMTS frequency band, comprising means for maintaining a list of CMTS channels previously accessed by the handset as WTS control channels and means for periodically updating the list as the location of the handset changes.

In a method of the invention as disclosed herein, the PCS handset automatically selects an operating mode by performing a scan of the CMTS channels to determine the presence of one or more WTS control channels; transmitting a registration request on WTS control channels found as a result of the scan; switching the handset to operate in the WTS mode on a WTS whose control channel has accepted the registration request; and switching the handset to operate in the CMTS mode if all WTS channels have denied the registration request.

BRIEF DESCRIPTION OF THE DRAWINGS

For a fuller understanding of the nature, features and advantages of the present invention, reference should be made to the following detailed description of a preferred, but nonetheless illustrative, embodiment of the invention, as illustrated by and taken in conjunction with the accompanying drawings wherein.

DESCRIPTION OF THE PREFERRED EMBODIMENT

Figure 1:
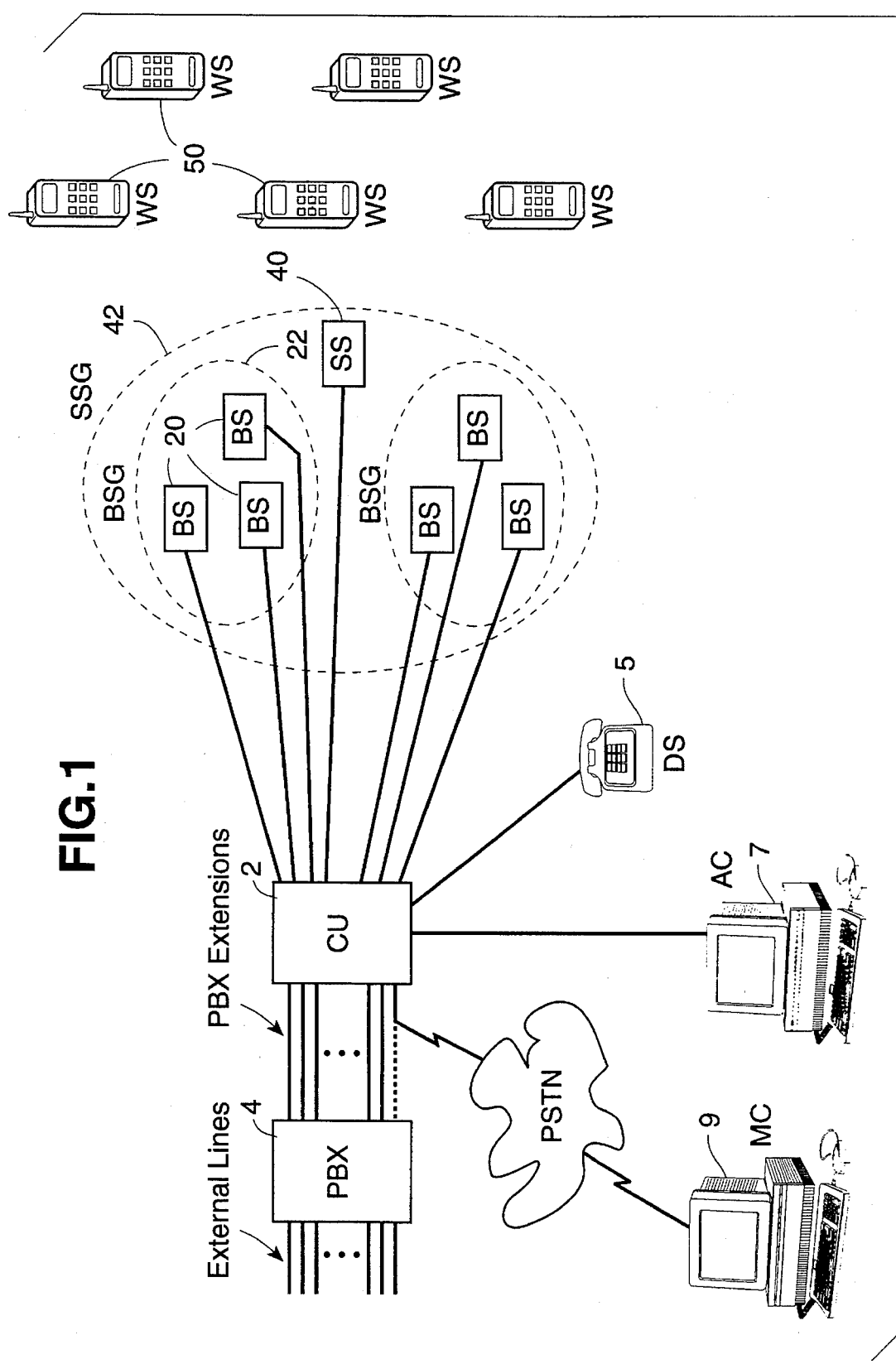
FIG. 1 shows the basic building blocks and a typical configuration for a PCS system.

The purpose of the personal communications system disclosed herein is to expand wireless telephone service to offices or buildings which now utilize, by way of example, conventional PBX or "CENTREX" telephone systems. The additional hardware needed to implement the PCS may be easily added to such existing private telephone systems, and operates in conjunction with lightweight portable dual-function PCS telephone handsets which may be easily carried by users as they go about their business activities. Each PCS handset includes all standard functions presently available to cellular telephones, and in addition can operate at lower power as a wireless extension within the smaller local operating area of the WTS. In an alternative embodiment, the PCS handset may be a single mode device which operates at low power only within the WTS.

In order to make more efficient use of the existing frequency spectrum, the WTS is formed of a plurality of microcells which operate within the same frequency band used by the co-existing CMTS in a manner which is consistent with the requirements of the Federal Communications Commission ("FCC") for sharing the 800–900 MHz frequency spectrum allotted to the CMTS. To do so, the PCS makes use of standard cellular frequencies (either A or B side), without interfering with or otherwise affecting the operation of the co-existing CMTS.

This is accomplished in the PCS by apparatus which dynamically selects those cellular voice channels which are unused in the local area covered by the WTS and makes those channels available to the WTS for use as either control or voice channels. In this manner, the available WTS channels may be dynamically updated to adjust to changes in the CMTS environment, such as the addition or splitting of cells, increased or decreased usage, etc.

By way of background, cellular mobile telephone systems in the United States presently operate under the Advanced Mobile Phone Service ("AMPS") protocol approved by the FCC. Under the AMPS protocol, the available 800–900 MHz CMTS frequency spectrum, which includes 1023 cellular channels, is divided into symmetric halves (A-side and B-side) in each geographical area. The B-side spectrum is under control of the wireline telephone carrier who services the geographical area, while the A-side spectrum is under control of an independent competitor.

Each CMTS broadcasts its own system identification number ("SID") and has allocated to it 21 channels which are dedicated to transmitting control signals and another 11 channels which are used for paging purposes. The remaining channels are used by the CMTS for voice transmission.

By way of example, the B-side cellular channels include the 21 dedicated control channels ("C-Ch") 334–354, 11 dedicated paging channels ("P-Ch") 355–365, and voice channels ("V-Ch") 366–666 and 717–799. To provide for full duplex operation, each channel includes two transmission frequencies respectively designated as the forward and reverse channels. The forward channel transmits information from a cell site to the cellular mobile telephone, whereas the reverse channel transmits information from the cellular mobile telephone to the cell site.

In the preferred embodiment of the invention, the PCS control channels are separate from the 32 dedicated CMTS control and paging channels, but are shared with the CMTS voice channels. Thus, with reference to a B-side CMTS, the possible C-Chs selected for use in the WTS begin at channel 366 and extend upwardly in channel number for a programmable block size which is determined by the level of CMTS activity in the local area covered by the WTS and the size and number of microcells which make up the WTS. For example, the channel block size allocated to WTS control channels might be set to 42 channels. However, for WTS's set up in large metropolitan centers having heavy CMTS traffic, the block size may be adjusted upwardly to ensure that sufficient control channels are available for the WTS. The channel block size data is transmitted on the WTS control channels and is stored within the PCS handset. When a PCS handset enters the area of another WTS, it acquires and stores the new channel block size transmitted by that WTS and may adjust its scanning procedure accordingly.

In the preferred embodiment of the PCS, based upon field experience, it is expected that a maximum channel block size of 127 channels will be adequate for virtually all WTS implementations. In this maximum channel block case, the control channels which the PCS selects for the WTS will, for the case of a B-side CMTS spectrum, be selected from channels 366–492 in the CMTS voice channel band. The WTS voice channels may then be selected from idle CMTS voice channels (e.g. 493–666 and 717–799). In addition to serving as control channels, the WTS control channels also act as both paging and access channels for the WTS. Each WTS is assigned a system identification number ("SID") by the CMTS operator, different from the CMTS SID, which is broadcast on the WTS control channels.

In the preferred embodiment, the PCS generally includes the components shown in FIG. 1, each of which is more fully described below.

Control Unit

Figure 2:
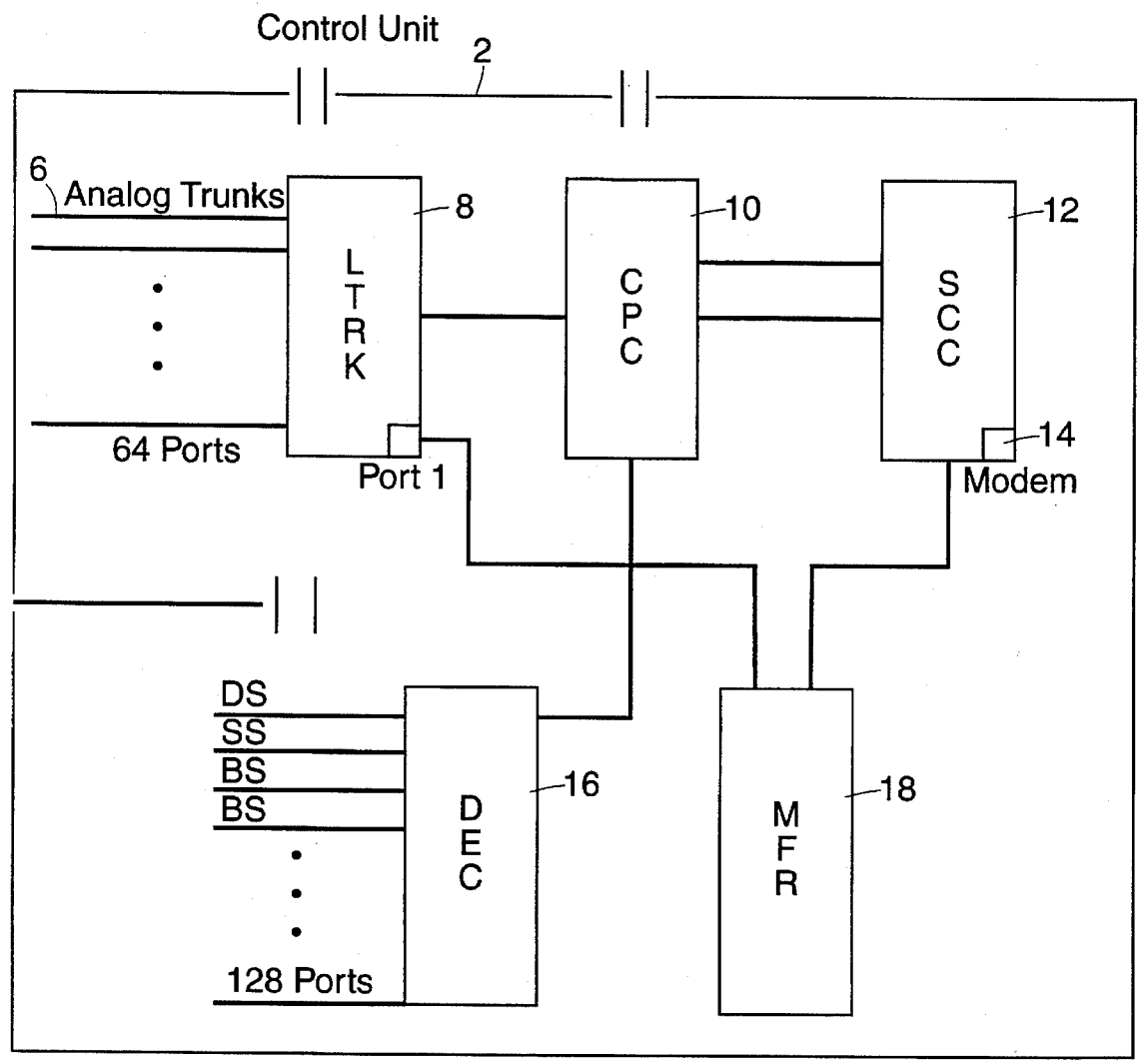
FIG. 2 is a block diagram showing the major circuit components of the control unit for the PCS system.

The control unit 2 ("CU") of the PCS performs all control functions such as maintaining information as to the specific configuration of the PCS, call processing, authentication and base station control. In the preferred embodiment, the CU 2 connects to the PBX 4 using standard 2500-set telephone extension wiring, and makes the PBX telephone extensions wireless. A block diagram of the components contained within the CU 2 is shown in FIG. 2. With reference thereto, the analog telephone trunk lines 6 connect to one or more loop trunk cards 8 ("LTRK") which function to monitor the ringing line, and to send ring and on-hook messages to a central processing card 10 ("CPC").

The CPC 10 acts as a communications controller and includes a microprocessor which can respond to software instructions provided in programmable read-only memories ("PROMS"). The CPC 10 connects to the PCS database which, in the preferred embodiment, is stored in a nonvolatile random access memory ("NV-RAM") addressable by the CPC 10.

As further shown in FIG. 2, the CPC 10 is connected to a service circuit card 12 ("SCC") which provides signaling tones and processes information received from peripheral devices. The SCC 12 also includes serial ports and has an on board modem 14. The CPC 10 is further connected to one or more digital extension cards 16 ("DEC") which provides appropriate interfaces and connections to the base stations and scanning stations of the PCS. As shown in FIG. 2, also included within the CU 2 is a multi-frequency receiver 18 ("MFR") which interprets the dual tone multi-frequency ("DTMF") signals provided along telephone lines to the modem and local connection ports.

The PCS software and system database are accessible to the communications controller in CPC 10. The PCS database may be further accessed by either connecting to the serial or digital port available in the CU 2, or by remotely dialing into the CU 2 via modem.

Base Stations

The base stations 20 ("BS") each include low power radio transceivers that provide the wireless link to the PCS handset. Base stations connect to the CU 2, which provides both power and signals to the base stations. Base station groups 22 ("BSG's") are configured by the CU 2 and consist of one or more individual base stations. Each BSG 22 has one base station 20 that serves as a control base station which operates to provide a combined control/paging channel. In the preferred embodiment, the control base station rotates among all base stations of the BSG 22. This reduces the impact of a hardware failure on the active control channel.

Figure 3:
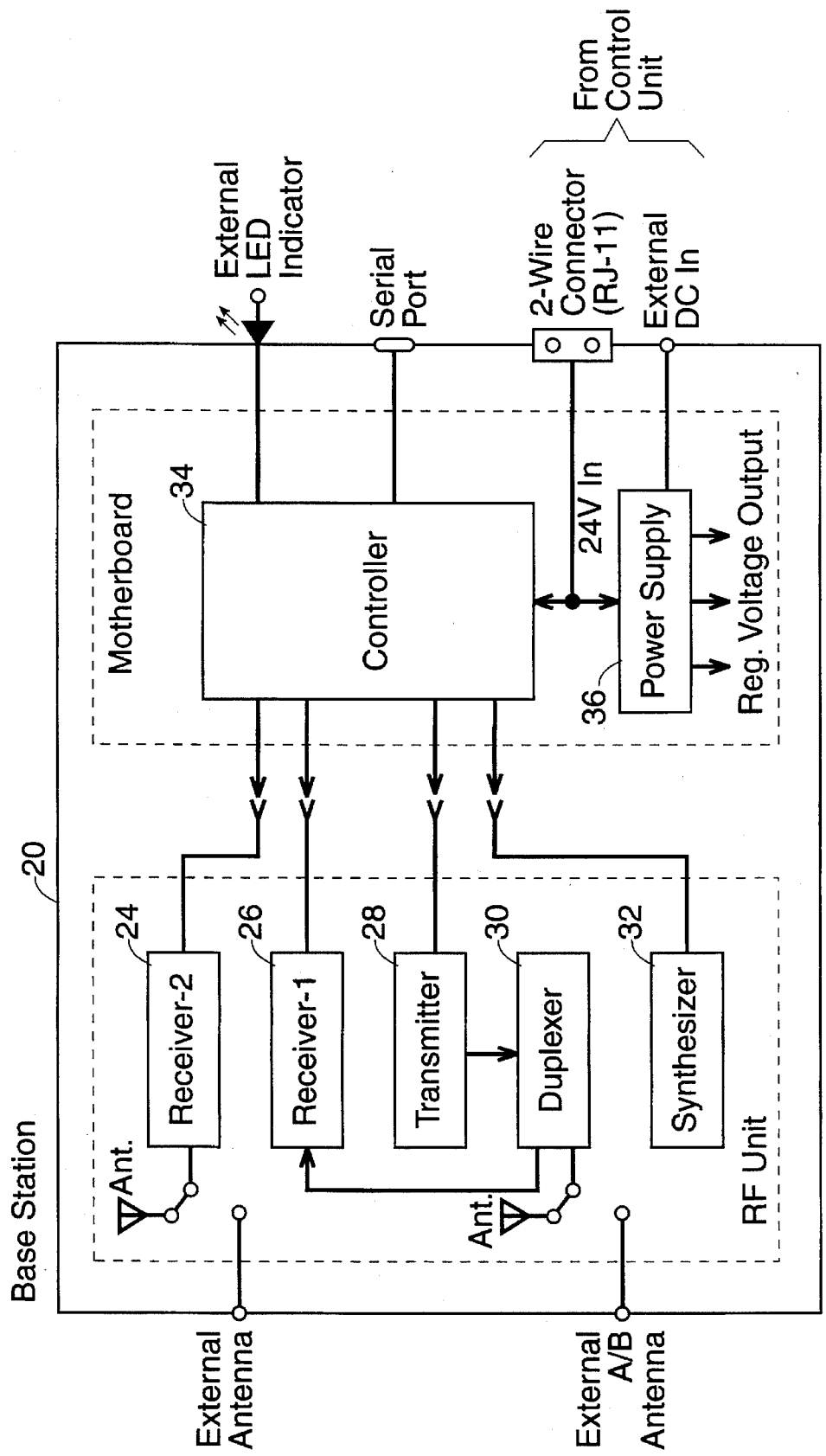
FIG. 3 is a block diagram showing the major circuit components of a base station used in the PCS system.

A block diagram of a base station 20 is shown in FIG. 3. In the preferred embodiment, each base station 20 has two built-in receivers 24, 26. While idling, one receiver can perform a search for free WTS V-chs, while the other handles incoming C-Ch information. When the base station 20 provides a voice channel, the base station 20 uses either one or the other of the receivers 24, 26 and can switch between the two.

In addition to the two receivers 24, 26, the base station 20 includes a transmitter 28, a duplexer 30 and a frequency synthesizer 32 as part of its RF unit. Each base station 20 has a controller 34 which converts the digital signals received from the control unit 2 to appropriate analog signals needed to operate the receivers 24, 26 and transmitter 28. Further, an internal power supply 36 receives an external DC voltage supplied from the CU 2 and conditions that voltage for output to the various RF components.

Scanning Station

The scanning station 40 ("SS") continuously monitors traffic on the cellular frequencies to determine which of the CMTS voice channels can be allocated by the PCS for use by the WTS. The scanning station 40 is directly wired to and powered by the CU 2. The scanning station 40 identifies idle and busy CMTS channels and reports them to the CU 2. In large coverage areas, the PCS may include several SS's since available channels may vary from zone to zone.

In the preferred embodiment, each SS 40 is associated with one or more BSGs 22, which together form a scanning station group 42 ("SSG"). Utilization of multiple SSG's permits the PCS to achieve greater spectrum efficiency by taking advantage of the separation of the base stations 20, and variations in transmission/reception conditions over the area serviced by the WTS. For example, base stations 20 near the center of a building are likely to have a larger pool of interference-free CMTS channels than those near exterior walls of the building.

Figure 4:
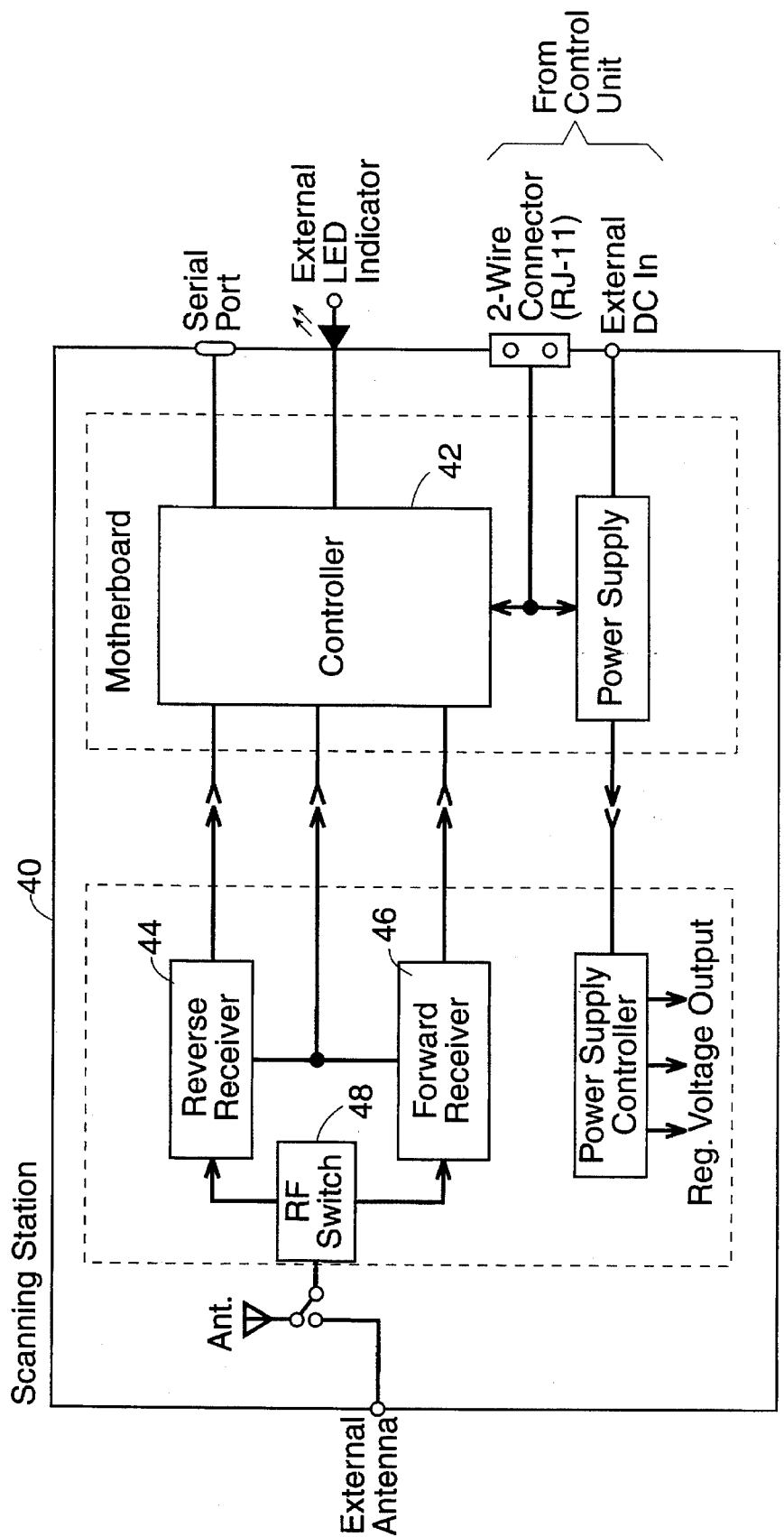
FIG. 4 is a block diagram showing the major circuit components of a scanning station used in the PCS system.

A block diagram of the scanning station 40 is shown in FIG. 4. With reference thereto, each scanning station 40 includes a controller 42 which processes digital signals provided by the CU 2 as well as signals output by the receivers 44, 46 within the scanning station 40. Both a reverse channel receiver 44, which listens to the PCS handsets 50, as well as a forward channel receiver 46 which listens to the base stations 20 are included within the SS 40. Incoming signals are appropriately routed to the forward and reverse receivers 44, 46 by an RF switch 48.

In addition, the scanning station 40 identifies and verifies transmission of the correct WTS system ID ("SID") and is also capable of performing measurements of received signal strength indication ("RSSI") on the reverse channel.

The PCS Handset

In the preferred embodiment, each PCS handset 50 is a dual-mode portable unit which can operate as either a full-powered portable cellular telephone, or as a lower power WTS extension telephone. Mode selection between CMTS or "external" mode and WTS or "internal" mode can be performed either manually or automatically. When mode selection is automatic, the PCS handset 50 will locate and lock-on to any CMTS or WTS within its range. In an alternative embodiment, the PCS handset may be a single mode unit which only operates as a WTS extension telephone.

In the preferred embodiment, and as will be more fully explained below, the PCS handset 50 attempts to use an available WTS system whenever possible, and only switches to CMTS mode when there are no detectable WTS signals, or when all the accessible WTS systems deny service requests. While in CMTS mode, the PCS handset 50 periodically searches for a WTS system which will provide service. As soon as one is found, the PCS handset 50 switches to WTS mode. However, such mode switches occur only when the PCS handset 50 is not engaged in a call.

Figure 5:
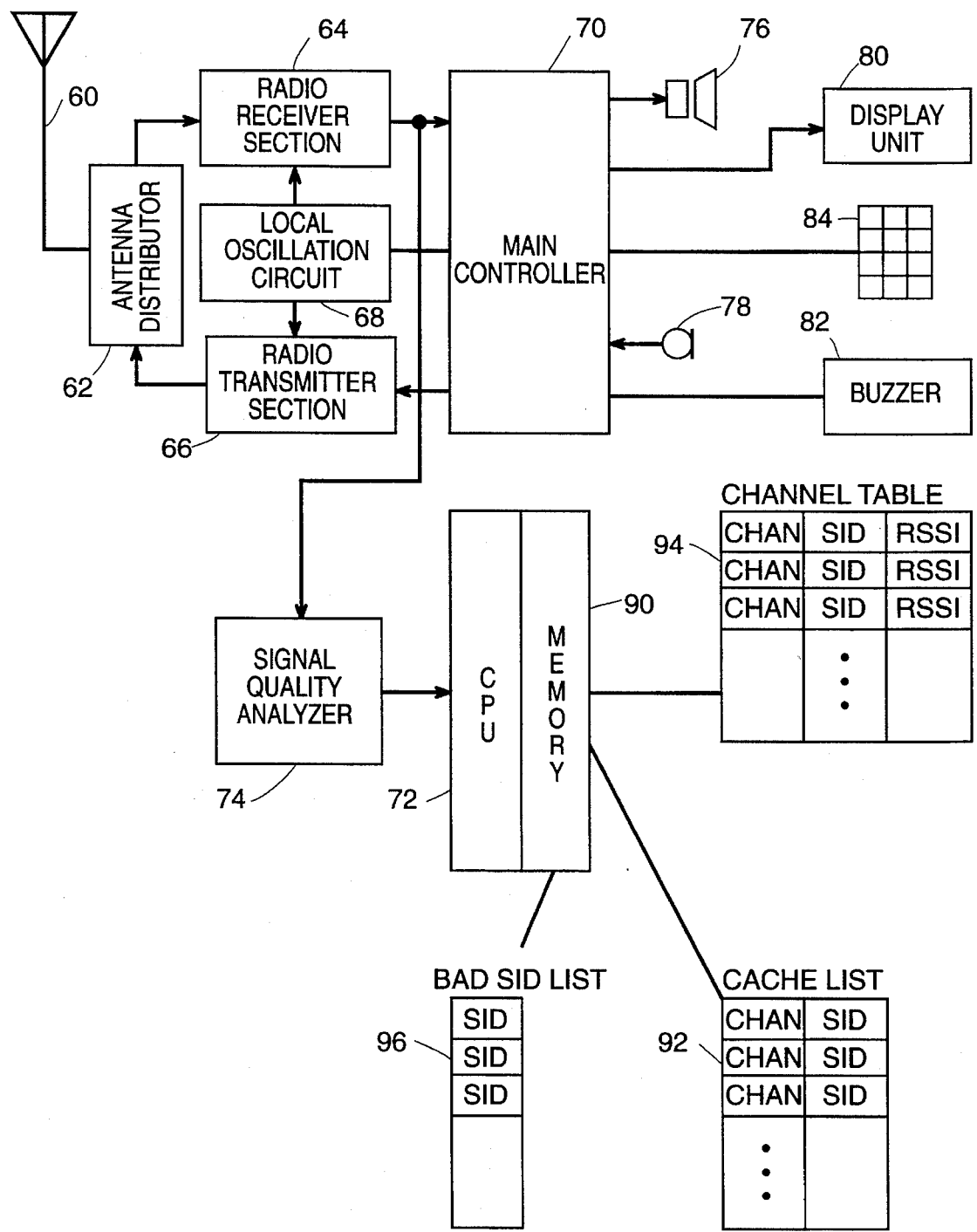
FIG. 5 is a block diagram showing the major circuit components of the PCS handset used in the PCS system.

A block diagram of the battery operated PCS handset 50 is shown in FIG. 5. With reference thereto, an antenna 60 is connected to an antenna distributor 62 to route transmitted signals from a radio transmitter section 66 to the antenna 60 and to route signals received by the antenna 60 to a radio receiver section 64. A local oscillation circuit 68 provides all necessary frequencies needed by the radio receiver section 64 and the radio transmitter section 66 to tune to any of the CMTS channels.

The PCS handset 50 further includes a main controller 70 which provides control signals to the radio receiver section 64, the radio transmitter section 66 and the local oscillation circuit 68, and receives signals from those components. The main controller 70 also communicates with a central processing unit 72 ("CPU") connected thereto. In addition, a signal quality analyzer 74 is coupled to the radio receiver section 64 and is responsive to the strength of received signals to provides RSSI information to the CPU 72 for analysis therein. As further shown in FIG. 5, the PCS handset 50 includes an earpiece 76, a microphone 78, an appropriate display unit 80, buzzer 82 and keypad 84.

In addition to these PCS system components, the preferred embodiment of the PCS includes, as shown in FIG. 1, a digital desk set 5 ("DS") and an administrative console 7 ("AC"), which are used to configure and maintain the PCS. The administrative console 7 may also be used to examine diagnostic/performance statistics, and to backup or restore the PCS database. The PCS further includes a cellular operator maintenance console 9 ("MC") which permits the cellular operator to monitor the PCS, perform remote system control and maintenance and retrieve billing related information.

Operation Of The PCS

In order to efficiently reuse the cellular frequencies of the CMTS and be able to rapidly adapt to changes in the local cellular environment, the PCS adopts both preventative and active measures to ensure that there is no interference between the active WTS and CMTS channels.

Preventative measures are implemented by the scanning stations 40, which detect CMTS channel usage and rapidly remove channels from the pool of idle cellular voice channels which are made available to the PCS for allocation to the WTS. However, channels are not added to the idle channel pool until they have been idle for a sufficiently long time to prevent erroneous additions.

To do so, the scanning stations 40 utilize a technique which analyzes each channel's level of activity within two time windows, based on two channel activity thresholds, to perform a sliding average type of analysis which determines whether or not a channel is to be deleted or added to the idle channel pool. In particular, the scanning technique uses an "addition activity threshold", which defines the maximum amount of activity a channel may have and still be added into the idle channel pool; as well as a "deletion activity threshold", which defines the minimum level of activity above which a channel will be deleted. In addition, the scanning technique makes use of a relatively short time duration "deletion window" as well as a longer time duration "addition window". Thus, if the activity level for a particular channel exceeds the deletion activity threshold within the short time interval defined by the deletion window, that channel will be deemed unusable and rapidly removed from the idle channel pool. However, if at a later time, the channel's overall activity within the relatively long duration addition window is less than the addition activity threshold, the channel may then be reused and is therefore reinserted into the idle channel pool. By way of example, the addition and deletion activity thresholds may be set to 5% and 3% respectively; and the deletion window and addition window may be set to 1 hour and 4 hours respectively.

Whenever channel additions or deletions are made by the SS 40, addition/deletion messages are sent to the CU 2. This allows the CU 2 to build and maintain a pool of CMTS channels which may be used by the base stations 20 in the SSG 42. The control unit 2 maintains idle channel pools for each SSG 42 at power-up. These idle channel pools are downloaded to every SS 40 and BS 20 in the scanning station group 42.

The idle channel pools are dynamically maintained and updated by the control unit, using information provided by the scanning stations 40 and base stations 20. For example, whenever a voice channel is activated or released by a base station 20, the control unit 2 is notified and a digital "channel in use" or "channel idle" message is sent to the scanning station 40 that belongs to the base station group 22. Further, whenever a scanning station 40 determines that a channel must be added to or deleted from the available idle channel pool, it updates its local pool, and sends an addition/deletion message to the control unit 2, which forwards the addition/ deletion message to all base stations 20 in the scanning station group 22.

Active interference detection measures are implemented by the base stations 20. If the supervisory audio tone ("SAT") which is transmitted on a voice channel becomes incorrect during a conversation, then the conversation is either handed off to a free voice channel, or terminated if no channel is available. Additionally, any illegal access attempt on a WTS control channel is assumed to be CMTS voice channel interference, and that channel is immediately deactivated by the base station 20. Report of this interference is made to the control unit 2, which deletes that WTS control channel from the idle channel pool and selects a new idle control channel for the BSG 22.

To summarize, by implementing the above measures to avoid interference with the CMTS channels which are currently in use in the local area serviced by the PCS, each PCS is able to maintain a list of re-useable cellular channels, i.e. the idle channel pool, which is continuously and dynamically updated and changed in response to cellular traffic being monitored on the CMTS. The idle channel pool is used by the PCS when allocating voice or control channels to the WTS. Base station groups 22 are automatically assigned control channels from the idle channel pool at power-up and use the idle channel pool to dynamically select idle voice channels.

In the preferred embodiment of the PCS, one control channel is selected for each base station group 22 and is continuously transmitting overhead messages, pages and other information needed by the PCS handsets 50. Within each base station group 22, the base station 20 that is transmitting on the control channel is used to initiate all calls. When a WTS voice channel is needed, the base station 20 switches from the control channel frequency to the new voice channel and ceases to operate as a control channel. The CU 2 then selects an idle base station 20 from the base station group 22 as the control channel transmitter.

Processing of inbound calls to the WTS is performed by the control unit 2, which directs each BSG 22 to page the PCS handset 50 that is associated with the called PBX line and wait for a response. If the PCS handset 50 responds to the page, the control unit 2 will allocate a voice channel between the appropriate base station 20 and the PBX line.

Whenever a voice channel is activated, the control base station 20 of the BSG 22 notifies the CU 2 of the voice channel and SAT to be used. The CU 2 in turn checks the channel/SAT combination against all other active transmissions in the WTS system. If the selected channel/SAT combination is actively in use, the CU 2 attempts to find a SAT that is not being used with that channel. If one is not found, the BS 20 is ordered to select a new channel and SAT. Once a valid voice channel and SAT are approved by the CU 2, the base station 20 sends the channel information to the PCS handset 50 and switches to the conversation mode. In an alternative embodiment the CU 2 may designate an available voice channel and SAT. In that case the base station 20 would confirm that such voice channel is idle before switching to the conversation mode.

Once a call is in progress, the CU 2 manages base station handoffs. A handoff is initiated by the conversation base station, but the CU 2 implements all BSG 22 handoff measurements, selects the best BSG 22 for handoff and completes the handoff by coordinating the new voice channel assignment.

New voice channel assignments are coordinated by validating the channel information received from the new base station 20 in accordance with the above described procedure and sending this information to the old base station 20 and PCS handset 50. When a PCS handset 50 switches to the new voice channel, the audio is transferred from the old base station to the new. During a conversation, the base station 20 will request a handoff if the reverse channel RSSI falls below the handoff initiating threshold.

While a base station 20 is in a conversation, it detects interference (both cellular and PCS) using the SAT signal. If the transponded SAT signal is lost or incorrect and the reverse channel RSSI is above the interference detection threshold, then the base station 20 determines that an interfering signal is being received and attempts to hand off the PCS handset 50 to an idle voice channel on the same base station. If the correct SAT is detected on the new voice channel, the handoff succeeds and normal operation resumes. However, if the correct SAT is not detected within a programmable time interval, the handoff fails and the base station 20 will release the voice channel and return to stand-by.

If a control base station detects SAT or a cellular access message on the reverse control channel, and the reverse channel RSSI is above the interference detection threshold for a predetermined time period, then such signal is considered to be cellular interference. SAT indicates that the cellular network may be using the channel as a voice channel, while a cellular access attempt implies that the channel is in use as a CMTS access channel. When either form of interference is detected, the base station 20 stops transmitting on that control channel, reports the interference to the CU 2 and returns to stand-by mode. In turn, the CU 2 then designates another control channel selected from the idle channel pool.

As another interference avoidance measure, if the base station 20 determines that the signals from a call in progress fall below an "out of range" threshold, the PCS will terminate the call to ensure that it does not interfere with an ongoing CMTS conversation.

To ensure that use of the WTS is restricted to only authorized users, in the preferred embodiment the PCS handsets 50 are required to automatically register with the WTS system upon entry thereto. All non-authorized PCS handsets 50 and all regular cellular handsets may still access the CMTS without interference when inside the WTS coverage area.

The PCS handset 50 may automatically select between the WTS and CMTS modes of operation but is designed to give preference to the WTS system in which it is currently registered. A handset is authorized by the PCS on a WTS by storing the handset's electronic serial number ("ESN") and CMTS mobile identification number ("MIN") in the PCS database. Whenever a PCS handset 50 attempts to enter a WTS system, it initiates a registration request. If the handset registration data is found in the PCS database of that WTS, the registration request is accepted. However, if the handset registration data is not found, the registration request is denied and the PCS handset 50, in accordance with the procedures disclosed below, will not attempt to re-register on that WTS until the PCS handset 50 is power-cycled.

Automatic Mode Selection

As discussed above, the current invention permits the PCS handset 50 to automatically locate and lock-on to any CMTS or WTS system within its range. In the preferred embodiment, the PCS handset 50 supports three operational modes—WTS only, CMTS only and automatic mode selection. When set for automatic mode selection, the PCS handset 50 attempts to use WTS systems whenever possible and only switches to CMTS mode when there are no detectable WTS signals, or when all the accessible WTS systems deny registration requests.

PCS roaming is implemented in a manner that is different in certain aspects from cellular roaming. The PCS handset 50 searches for a WTS control signal. If one is found, the PCS handset locks on to that WTS control signal and attempts to register with that WTS System. If registration is denied, the PCS handset 50 first attempts to locate and register on any other available WTS system. If no authorized WTS system can be found, then the PCS handset 50 switches to CMTS mode. In accordance with the present invention, the PCS handset will not attempt to re-register on an unauthorized WTS system until the next time it is power cycled. This prevents excessive registration denials from loading the PCS.

When a WTS signal is lost, the PCS handset 50 first attempts to locate a control channel on the WTS system to which it was last registered. If this fails, it attempts to locate a new WTS System. If the WTS SID contained in the system parameter overhead message of a WTS channel is different from that of the last accessed WTS SID, the PCS handset 50 will attempt to register on the new WTS. A registration denial will result in a switch of the PCS handset 50 to CMTS mode.

Once in CMTS mode, the PCS handset 50 periodically performs background scans of the WTS control channels. If a WTS signal is found (and is not transmitting a SID which resulted in a registration denial), the PCS handset 50 attempts to switch to WTS mode.

As evident from the above descriptions of the PCS system, its desired operational characteristics and intended environment, a number of unique problems arise in implementing the PCS system which are not of concern to a CMTS. For example, the CMTS operates with 21 dedicated control channels which may be scanned in rapid succession by a cellular telephone handset for the purpose of acquiring and locking on to a CMTS control channel which is capable of providing CMTS service. However, the comparable situation with respect to the PCS is considerably more complicated.

As a practical matter, depending upon the amount of traffic within the co-existing CMTS, the CMTS voice channels which may be made available by the PCS to the WTS in the idle channel pool may be widely dispersed over 100 or more CMTS voice channels.

Accordingly, the PCS handset 50 may have to scan in excess of 100 CMTS voice channels before finding the control channel of a WTS which will accept its registration request. Further, the scan time per CMTS voice channel is relatively long in comparison to the scanning of dedicated CMTS control channels by a conventional cellular telephone, since, for each channel in the scan, a determination must be made as to whether that channel is acting as a WTS control channel, or whether it is an active voice channel of the WTS or CMTS. Such determination of the channel status might, by way of example, take approximately 300 msec per channel. Thus, in such example, if the PCS handset 50 needs to scan 100 channels before finding an appropriate WTS control channel, the scan might take approximately 30 seconds. Such lengthy scan time would be unacceptable to a practical PCS system. This is because paging signals indicative of an incoming telephone call generally consist of two short bursts of data which are transmitted approximately 5 seconds apart. Thus, the probability that paging signals may be lost during the channel scan procedure increases as the channel scan time goes up.

A second but related problem which arises in the PCS environment is the fact that such environment is likely to include many different overlapping WTS systems, each of which is distinguishable by its characteristic SID. This might be the typical case in a large office building in which companies on different floors or portions of floors are each utilizing the PCS to establish WTS systems. In such environment of multiple, highly overlapping WTS systems, it is highly desirable for the PCS handset 50 to maintain its operation within the WTS in which it is currently registered for as long as possible and not attempt to register on another WTS which overlaps the same service area. This is very different from the requirements for a CMTS handset, which is generally designed to lock on to the strongest control channel of the 21 dedicated CMTS control channels.

Further, in a PCS environment, it is desirable for the PCS handset 50, if service is not available with a WTS system, to continue to scan for an available WTS system which will provide service. Otherwise, if the strongest control channel signal is that of a WTS system in which the PCS handset is not authorized, the PCS handset 50 may, unknowingly to the user, lock on to such unauthorized WTS system and never receive pages from its own WTS system whose control channel signal may be locally weaker at the location of the PCS handset 50.

To avoid these problems and provide the PCS handset 50 with the desired functionality, the automatic mode selection of the PCS handset 50 implements the scanning techniques which are disclosed below.

First, and with further reference to the block diagram of the PCS handset 50 shown in FIG. 5, the PCS handset 50 has a memory 90 which maintains a cache list 92 which stores the most recently accessed WTS control channels. The cache list 92 contains the channel number for each of those control channels and the SID for the WTS utilizing those control channels. New control channels may be added to the top of the cache list 92, and as the new channels are added, channels are removed from the bottom of the list. In a preferred embodiment, the cache list 92 can store up to 7 channel numbers and their associated SIDs. However, the capacity of the cache list 92 may be increased or decreased in accordance with the needs of the PCS.

With further reference to FIG. 5, the PCS handset 50 also maintains a channel table 94 in memory 90. The channel table 94 is created as part of the cache scan and full scan processes described more fully below. The channel table 94 maintains a list of channels for which a valid PCS overhead message has been received, indicating that the channel is a WTS control channel. The channel table 94 includes the channel number, the SID associated with that channel number and the RSSI measured for that channel. In addition, as shown in FIG. 5, the memory 90 of the PCS handset 50 maintains a bad SID list 96 corresponding to the SIDs of WTS systems which have denied registration requests transmitted by the PCS handset 50.

When set to automatic mode selection, it is desirous for the PCS handset 50 to automatically select and promptly lock on to an authorized system that is either a WTS or CMTS system within its range. Further, when in WTS mode, it is desirous for the PCS handset 50, whether a dual-mode handset or one which only operates in WTS mode, to always attempt to remain within the WTS in which it is currently operating. To accomplish this, the PCS handset 50 performs certain scans which are now described in detail.

Initial Cache Scan And Full Scan

In the preferred embodiment of the invention, upon power up or while in either the CMTS or WTS mode and not engaged in conversation, the PCS handset 50 periodically scans the CMTS channels for WTS signals.

FIGS. 6–11 are state diagrams which identify the various states a PCS handset 50 goes through during the automatic mode selection process. The pathways connecting the various states are identified by the conditions which must be satisfied to move along the respective pathways, with "/" representing a logical "or" and "+" representing a logical "and" condition.

Figure 6:
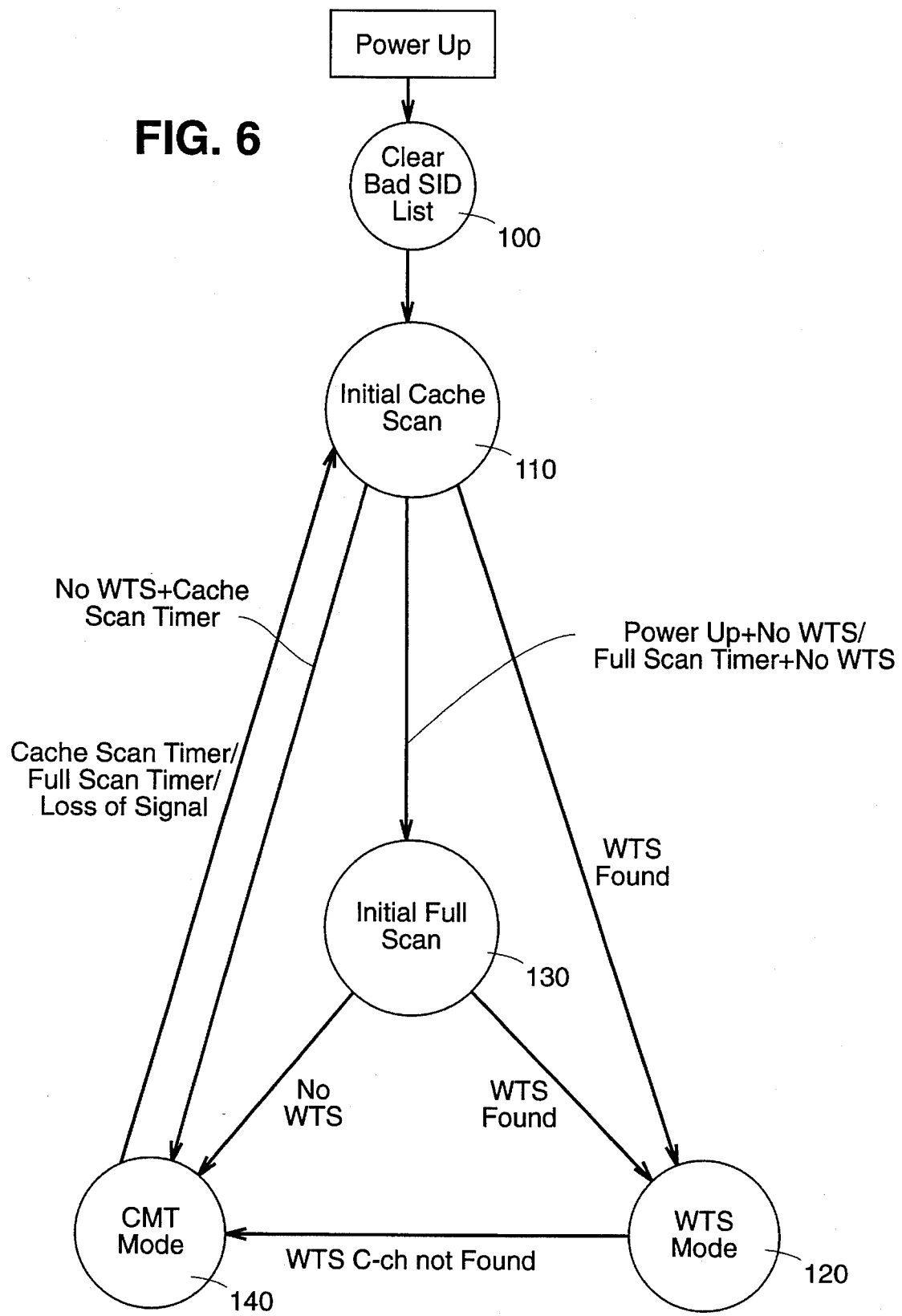
FIG. 6 is a state diagram for the PCS handset showing how the automatic mode selection process is implemented by the PCS handset.

With reference to FIG. 6, at each power-up of the PCS handset 50, the bad SID list 96 is cleared at state 100 and the PCS handset 50 performs an "initial cache scan" (state 110) which is described below and shown more fully in FIG. 7. If a WTS control channel is found during the initial cache scan, the PCS handset 50 enters the WTS mode (state 120). If a WTS channel is not found during the initial cache scan after power-up, then the PCS handset 50 enters an "initial full scan" (state 130). If a WTS control channel is found during the initial full scan, the PCS handset 50 enters the WTS mode (state 120). However, if the initial full scan indicates that there is no WTS control channel operating in the area, then the PCS handset 50 automatically switches over to the CMTS mode (state 140).

As further shown in FIG. 6, when in the CMTS mode, the PCS handset 50 periodically scans the CMTS frequency spectrum for available WTS control channels, either at certain predetermined time intervals or when the CMTS signal is lost.

In the preferred embodiment, a cache scan timer may be set to a relatively short time interval (e.g. 60 seconds) and a full scan timer may be set to a longer time interval (e.g. 5 minutes). While in CMTS mode, the PCS handset 50 will perform an initial cache scan whenever the cache scan timer times out (e.g. every 60 seconds) or whenever the CMTS signal is lost. If no WTS channel is found during the initial cache scan, the PCS handset 50 stays in the CMTS mode. When the full scan timer times out (e.g. at 5 minute intervals) the PCS handset 50, while in CMTS mode, will perform an initial full scan to search for WTS control channels, and will remain in the CMTS mode if no available WTS control channels are found. If a WTS control channel is located, the PCS handset 50 will attempt to access the WTS that is transmitting that control channel.

Thus, in the preferred embodiment, the PCS handset 50 while in CMTS mode periodically performs an initial cache scan (e.g. at 60 second intervals) and an initial full scan (e.g. 5 minute intervals) to look for the presence of WTS control channels). If any WTS channels are found, then the PCS handset 50 switches from CMTS mode to WTS mode. In this manner, the PCS handset 50 preferably switches to the WTS mode whenever the periodically executed initial cache scan or initial full scan indicates the presence of an available WTS control channel and a subsequent handset registration request is accepted.

Figure 7:
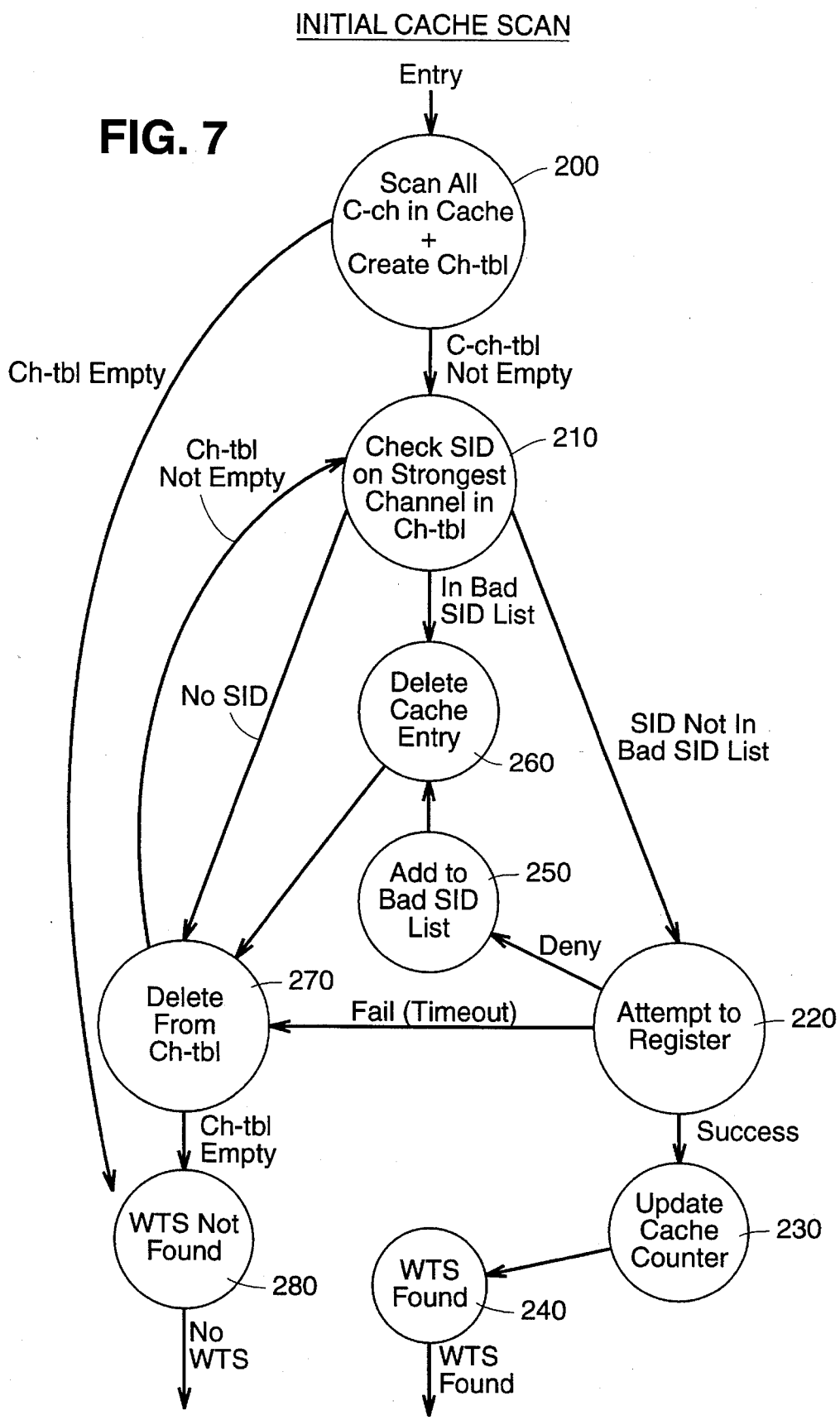
FIG. 7 is a state diagram for the PCS handset showing how the scan of previously accessed control channels is performed as part of the automatic mode selection process implemented by the PCS handset.

The state diagram for the initial cache scan is shown in FIG. 7. With reference thereto, at the start of the initial cache scan, the local oscillator circuit 68 tunes the radio receiver section 64 of the PCS handset 50 to each channel stored in the cache list 92 (state 200). If an appropriate digital signal pattern is received indicating that the channel is operating as a WTS control channel, then that channel number, the corresponding WTS SID transmitted on the control channel and its RSSI (measured by the signal quality analyzer 74) are stored in the channel table 94. After all channels in the cache list 92 have been scanned and the channel table 94 is created, the PCS handset 50 selects the strongest channel (state 210) (i.e. that channel having the largest RSSI) whose associated SID is not on the bad SID list 96 and attempts to register (state 220) on that channel. If registration is successful, the cache list is updated (state 230) and the PCS handset goes into the WTS mode using that control channel (state 240). If registration is not successful, the PCS handset 50 scans to the next strongest channel in the channel table 94 and so on until the channel table 94 is emptied or until registration is successful. In the initial cache scan process, a bad SID list 96 is created (state 250) and the SIDs of those WTS system control units which deny a registration request (so called bad SIDs) are deleted from the cache list 92 (state 260) and the corresponding channels are deleted from the cache list 92 and channel table 94 (state 270). As a consequence, subsequent registration attempts are not again attempted on these control channels.

Figure 8:
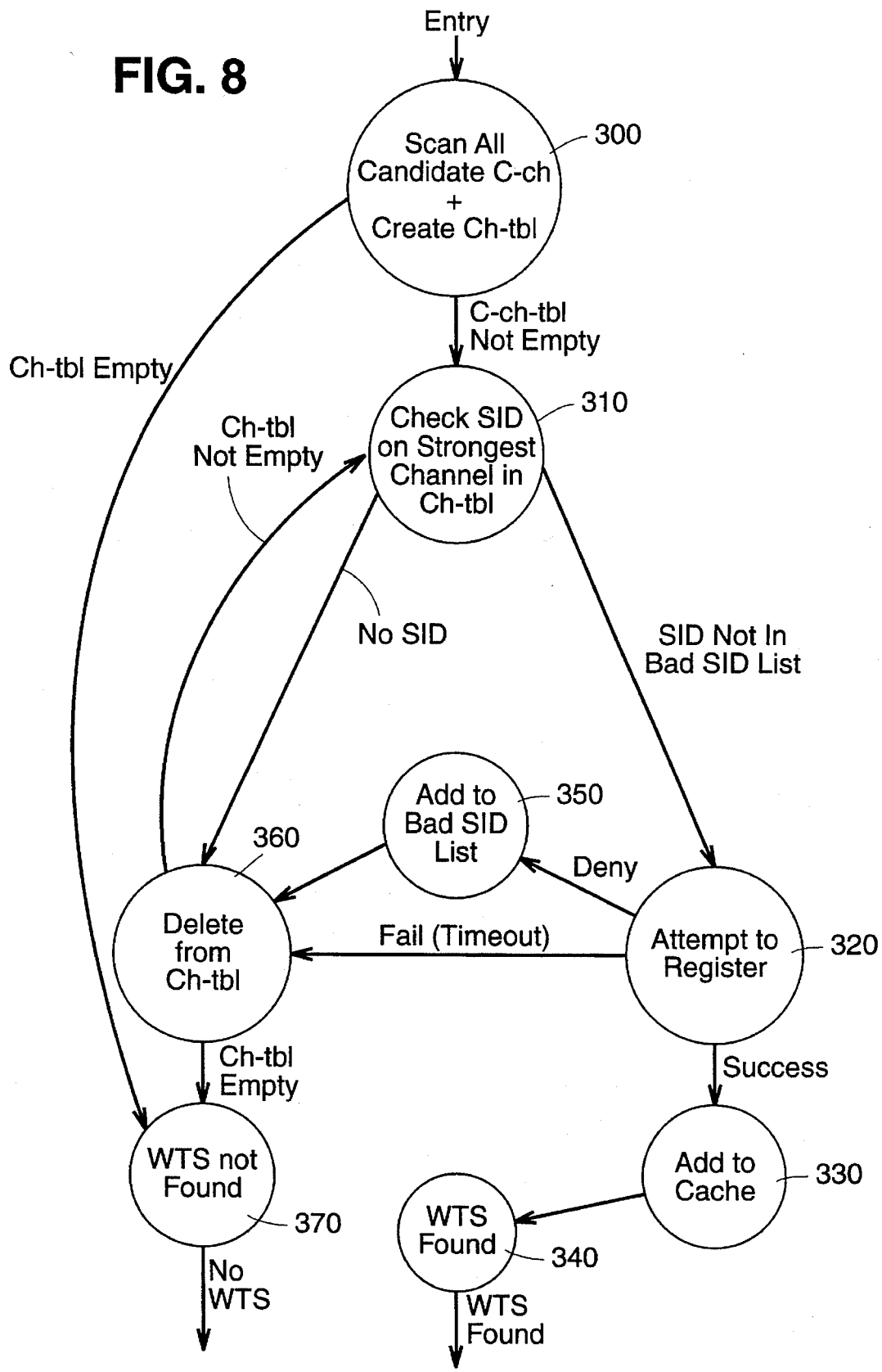
FIG. 8 is a state diagram for the PCS handset showing how the full scan of control channels is performed as part of the automatic mode selection implemented by the PCS handset.

If the initial cache scan fails to find a valid WTS control channel (state 280) or a WTS which will accept its registration request, the PCS handset 50 commences an initial full scan, the details of which are shown in FIG. 8. With reference thereto, the initial full scan is similar to the initial cache scan, but is not limited to scanning only those channels on the cache list 92. Rather, the initial full scan scans the entire range of possible WTS control channels (state 300), which may be identified by a programmable value stored in the PCS handset 50. As in the initial cache scan, the SID associated with the strongest channel found during the scan is checked first (state 310), and if not contained in the bad SID list, a registration attempt is made on that channel (state 320). If a WTS control channel is found and the associated WTS permits the PCS handset 50 to register, it is added to the cache list 92 at state 330 (if not already present) and the PCS handset 50 enters the "WTS found" state (state 340) which puts it into WTS mode (see FIG. 6). If the attempted registration is denied, then that SID is added to the bad SID list (state 350) and the control channel deleted from the channel table (state 360). This cycle is repeated until a registration attempt is successful or the channel table is emptied. If the initial full scan fails to find an available WTS control channel during this process, then the PCS handset 50 goes into the "WTS not found" state (state 370) and reenters the CMTS mode, as shown in FIG. 6.

Figure 9:
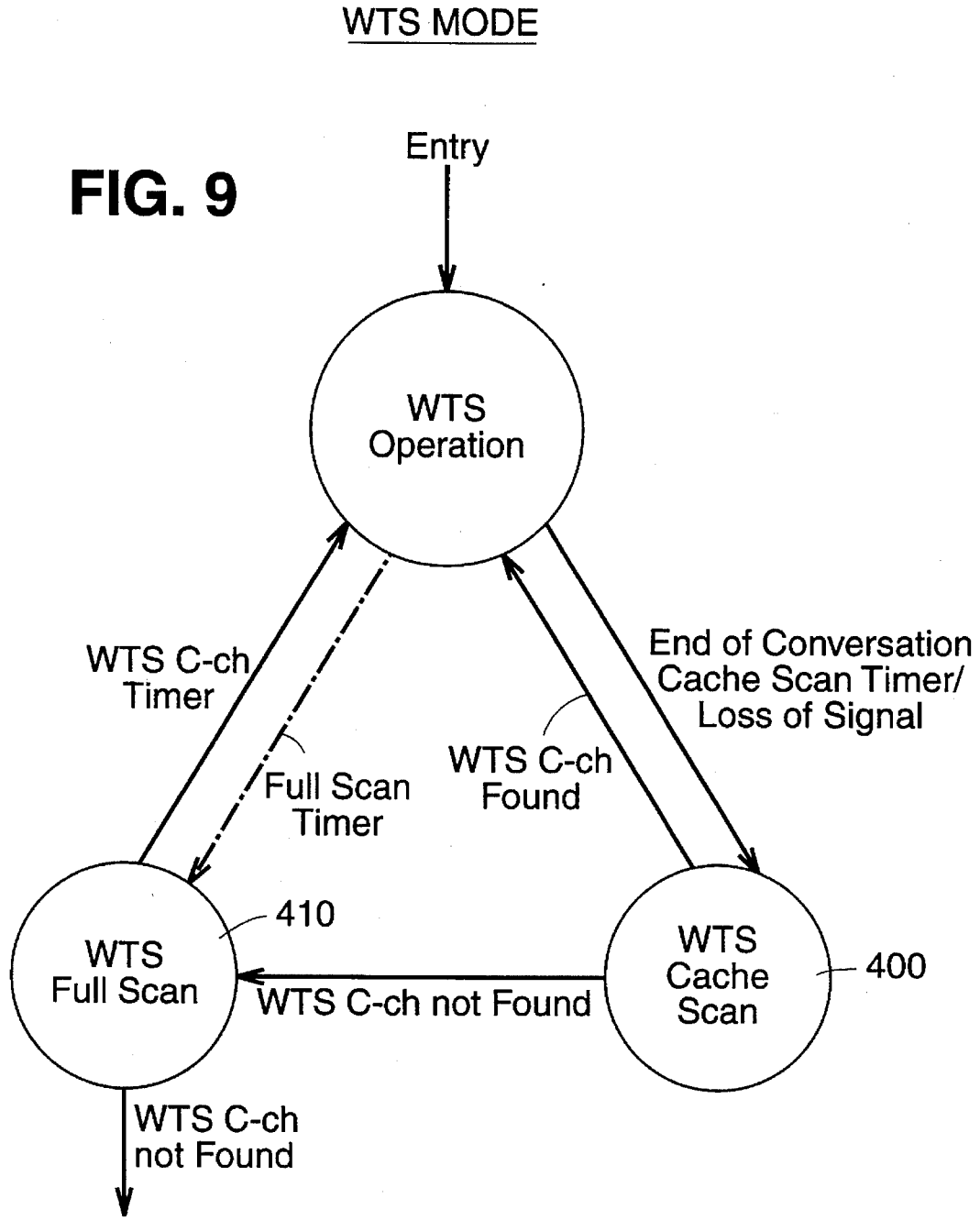
FIG. 9 is a state diagram for the PCS handset showing how the WTS mode is performed during the automatic mode selection process implemented by the PCS handset.
Figure 10:
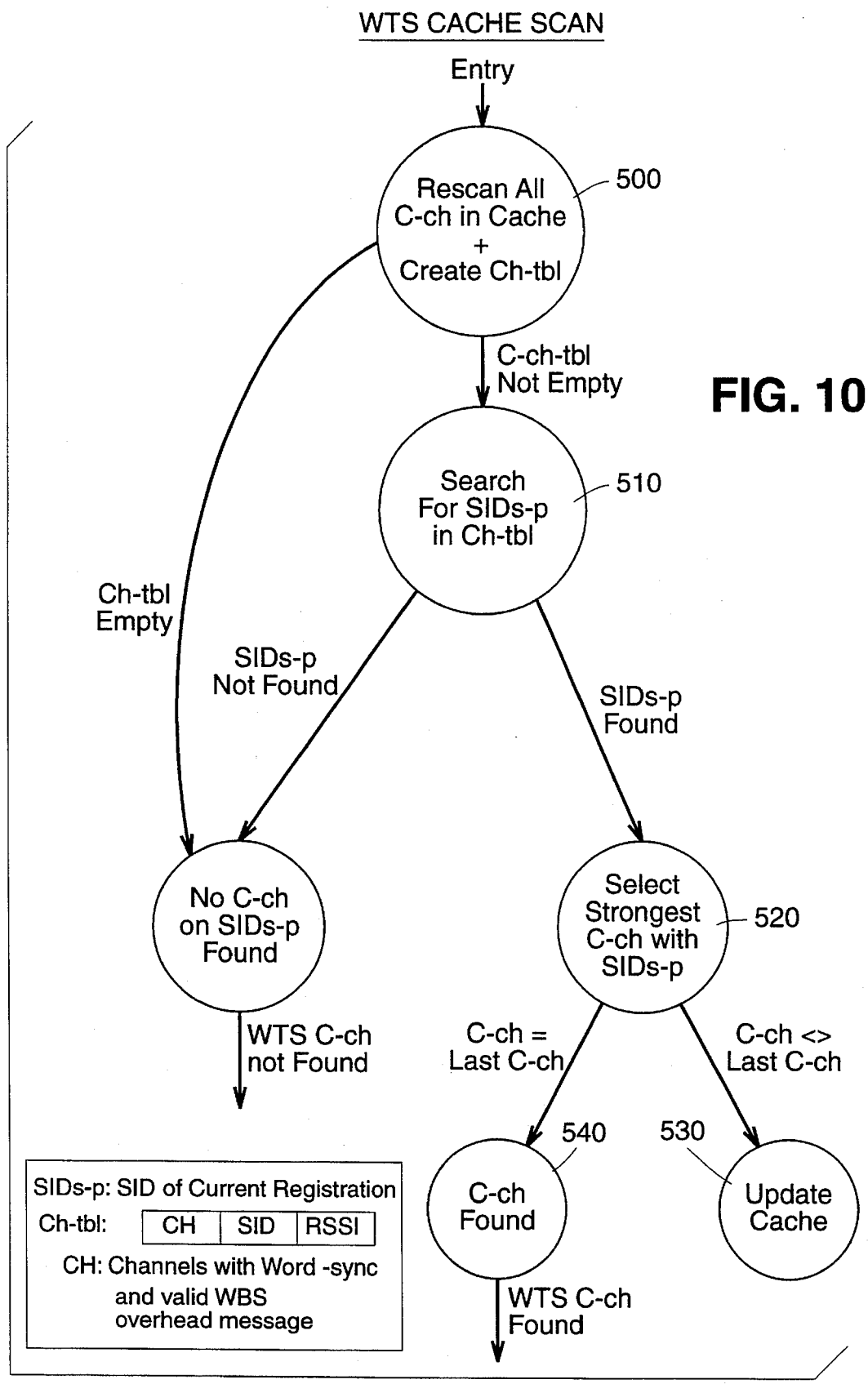
FIG. 10 is a state diagram for the PCS handset showing how the scan of previously accessed control channels is performed while the PCS handset is in WTS mode as part of the automatic mode selection implemented by the PCS handset.
Figure 11:
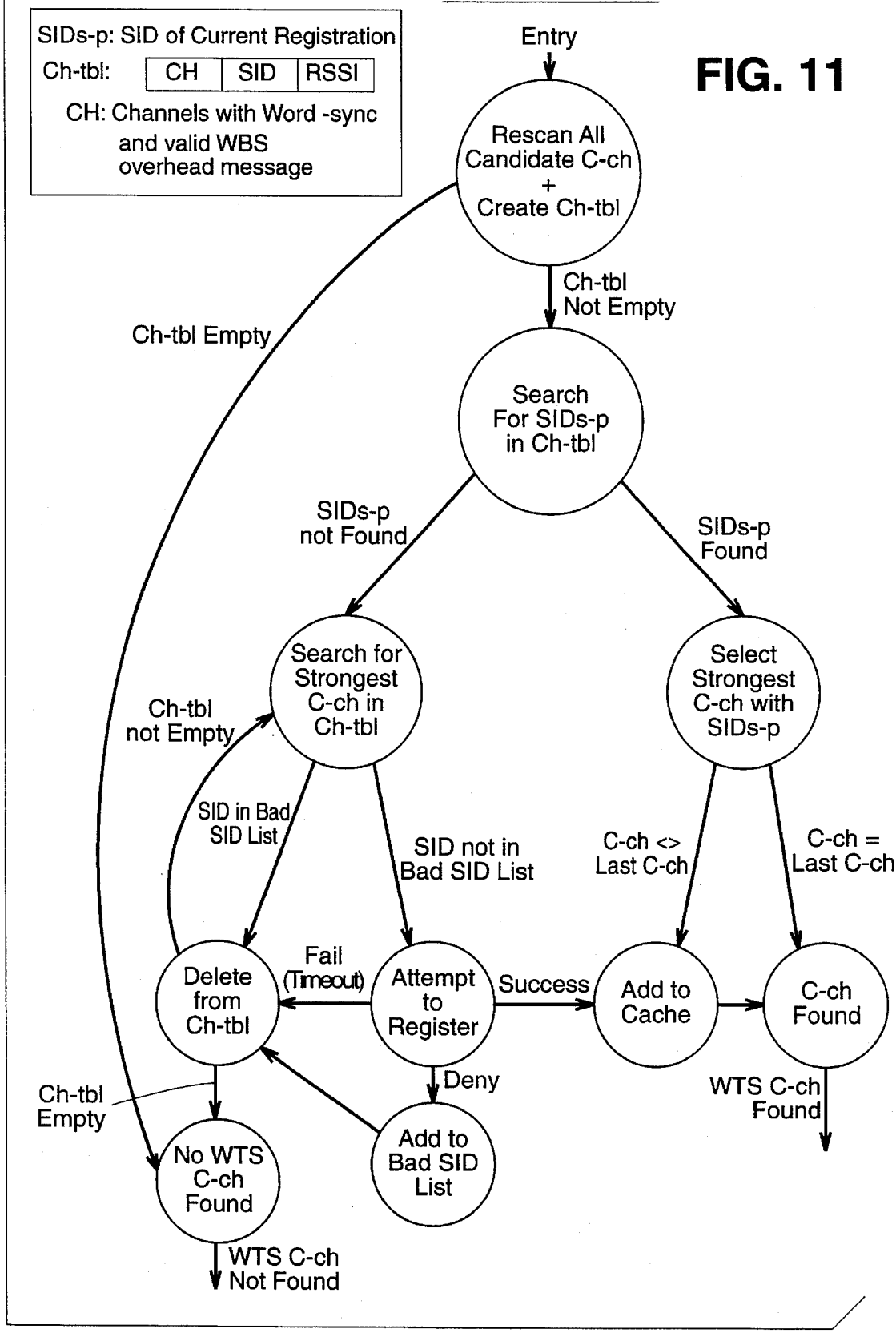
FIG. 11 is a state diagram for the PCS handset showing how the full scan of control channels is performed while the PCS handset is in WTS mode as part of the automatic mode selection implemented by the PCS handset.

While in the WTS mode, the PCS handset 50 periodically performs a "WTS cache scan" (state 400) and "WTS full scan" (state 410) shown in FIG. 9 in accordance with the state diagrams shown in FIGS. 10 and 11, respectively. With reference to FIG. 9, upon entering the WTS mode, the PCS handset 50 will initiate a WTS cache scan either 1) at the end of each conversation; 2) when a loss of signal occurs; or 3) when the cache scan timer times out (e.g. every 60 seconds). If the WTS cache scan finds a WTS control channel and associated WTS on which the PCS handset 50 is registered (i.e. having the same SID), then the PCS handset 50 stays in the WTS operating mode on that WTS system. However, if the WTS cache scan is not successful in finding an appropriate WTS control channel, or when the full scan timer times out (e.g. every 5 minutes), the WTS full scan shown in FIG. 11 is initiated. Here again, if any WTS control channel is found and the associated WTS permits the PCS handset 50 to register, then the PCS handset 50 stays within the WTS mode on that WTS control channel. On the other hand, if no such channel is found, then the PCS handset 50 enters the CMTS mode.

As evident from FIGS. 10 and 11, the WTS cache scan and WTS full scan perform operations which are substantially similar to those of the initial cache scan and initial full scan, with the exception that in the WTS cache scan, the channel table is searched only for those channels transmitting SIDs matching that of the currently registered SID (referred to herein and in the drawings as the "SIDs-p").

Thus in the WTS cache scan (FIG. 10), the PCS handset 50 scans the cache list and creates the channel table 94 (state 500), as in the initial cache scan of FIG. 7. However, in the WTS cache scan, the channel table 94 is searched for channels transmitting SIDs (SIDs-p) which match the currently registered SID (state 510). The channel transmitting the SIDs-p with the highest RSSI is then selected (state 520). If that channel number does not match the current channel number, then that channel number is added to the cache list (state 530) and the PCS handset 50 moves over to that stronger channel, but stays operational within the same WTS system (state 540). If the current channel corresponds to the strongest SIDs-p channel, the PCS handset 50 remains in WTS mode on that channel. In this manner, the PCS handset 50 will preferably stay registered on the current WTS system, even if a stronger signal is received from an overlapping WTS system (which necessarily has a different WTS SID).

Likewise, in the WTS full scan, the PCS handset 50 will also prefer to remain in the WTS corresponding to the currently registered SID. However, in the WTS full scan, if no channel scan be found transmitting the currently registered SID, but WTS control channels transmitting other SIDs are found, the PCS handset 50 will attempt to register on the strongest WTS channel regardless of SID.

As will be evident from a full consideration of the state diagrams shown in FIGS. 6–11, the implementation of a cache list 92 and channel table 94 and the scanning thereof by the PCS handset 50, either upon power-up, or at predetermined intervals thereafter, ensures that the PCS handset 50 will, whenever possible, rapidly lock on to an authorized WTS control channel without utilizing scan times which would result in pages to the PCS handset 50 being missed. Further, the performance of full scans of the channels at longer intervals (as may be designated by the channel block size data or other programmable values), further ensures that the cache list 92 will be updated with authorized WTS channel information in a local area within the interval set by the full scan timer (e.g. 5 minutes).

To summarize, upon power-up, the PCS handset 50 checks the cache list 92 and attempts to find a WTS channel along which it can register. If it is unsuccessful, then it begins a broader based initial full scan of all channels in the channel block and if a WTS control channel is found which is associated with a WTS which permits the PCS handset 50 to register, the PCS handset 50 switches to WTS mode. Otherwise, it switches to CMTS mode.

While in CMTS mode, the cache and full scans are periodically made in an attempt to locate a WTS control channel and effect an automatic switchover to the WTS mode if a WTS control channel is found. Likewise, while in WTS mode, the PCS handset 50 performs periodic cache scans and full scans at corresponding short and long time intervals. If channels are found transmitting a SID corresponding to the SID of the WTS system in which the PCS handset 50 is currently registered, then the PCS handset 50 remains locked to the strongest control channel within that WTS in which it is registered. On the other hand, if no currently registered SIDs are found, then the PCS handset 50 performs a WTS full scan, and in that event, may find another WTS system with a different SID which permits registration. Otherwise, it enters the CMTS mode.

By implementing the automatic mode selection feature in the manner disclosed above, the PCS handset 50, once registered within a WTS, will always attempt to maintain operation within that WTS and not be affected by the possible presence of stronger signals originating from other overlapping WTS systems. In addition, by maintaining the bad SID list 96, the PCS handset 50 will not attempt to scan and re-register with a WTS which has previously denied its registration request. Further, the PCS handset 50 will always lock on to an authorized WTS, if one is available, in preference over the CMTS system.

Although the invention herein has been described with reference to particular embodiments, it is to be understood that these embodiments are merely illustrative of the different aspects and features of the invention. As such, a person skilled in the art may make numerous modifications to the illustrative embodiments described herein and other arrangements may be devised to implement the invention without departing from the present scope of the disclosed invention as claimed herein.

What is claimed is:

1. A method for automatically selecting an operating mode for a dual-mode telephone handset adapted to operate in a cellular mobile telephone system (CMTS) and in at least one wireless telephone system (WTS), said at least one WTS having a control unit and sharing the CMTS frequency band by utilizing those CMTS channels which are idle in the area serviced by said WTS, comprising the steps of:

(a) storing previously accessed WTS control channels in a list in a memory of said telephone handset;

(b) performing a first scan in said handset of said channels on said list to determine the presence of one or more WTS control channels;

(c) transmitting a registration request from said handset to the control unit of said at least one WTS on one or more of said WTS control channels found as a result of said first scan;

(d) switching said handset to operate in an WTS mode on a WTS whose control unit has accepted said registration request;

(e) performing a second scan with said telephone handset of all CMTS channels which are also available to be used as WTS control channels to determine the presence of a WTS control channel if said registration request in step (c) is denied by each WTS associated with the control channels on said list;

(f) transmitting a registration request from said handset to the control unit of said at least one WTS on said WTS control channels found as a result of said second scan;

(g) switching said handset to operate in said WTS mode on a WTS whose control unit has accepted a registration request in step (f); and (h) switching said handset to operate in said CMTS mode if said registration request in step (f) is denied by each WTS associated with a control channel located during said second scan.

2. The method of claim 1 wherein said first and second scans are performed periodically.

3. The method of claim 2 wherein said first scan is performed more frequently than said second scan.

4. The method of claim 1 wherein the steps of transmitting registration requests are performed on said WTS control channels in the order of decreasing received signal strength of said WTS control channels, whereby a registration request is first sent along the strongest WTS control channel.

5. The method of claim 1 wherein a registration request is not transmitted to any WTS control unit which has previously denied registration requests by said telephone handset in said area.

6. A method for automatically switching a dual-mode telephone handset from a cellular mobile telephone system (CMTS) operating mode to a wireless telephone system (WTS) operating mode, said WTS having a control unit and sharing the CMTS frequency band by utilizing those CMTS channels which are idle in the area serviced by said WTS, said method comprising the steps of:

(a) storing previously accessed WTS control channels in a list in a memory of said telephone handset;

(b) periodically performing a first scan in said handset of said channels on said list to determine the presence of a WTS control channel;

(c) transmitting a registration request from said handset to the WTS control unit via the WTS control channels found as a result of said first scan;

(d) switching said handset to operate in said WTS mode on a WTS whose control unit has accepted said registration request;

(e) periodically performing a second scan of all CMTS channels which are also available go be used as WTS control channels to determine the presence of a WTS control channel if the registration request in step (c) is denied;

(f) transmitting a registration request from said handset to the WTS control unit via the WTS control channels found as a result of said second scan; and (g) switching said handset to operate in said WTS mode on a WTS whose control unit has accepted a registration request in step (f).

7. The method of claim 6 wherein said first scan is performed more frequently than said second scan.

8. The method of claim 6 wherein the steps of transmitting registration requests are performed on said WTS control channels in the order of decreasing received signal strength of said WTS control channels, whereby a registration request is first sent along the strongest WTS control channel.

9. The method of claim 6 wherein a registration request is not transmitted to any WTS control unit which has previously denied registration requests by said telephone handset in said area.

10. A method for automatically switching a dual-mode telephone handset from a wireless telephone system (WTS) operating mode to a cellular mobile telephone system (CMTS) operating mode, said WTS having a WTS control unit and sharing the CMTS frequency band by utilizing those CMTS channels which are idle in the area serviced by said WTS, said method comprising the steps of:

(a) storing previously accessed WTS control channels in a list in a memory of said telephone handset;

(b) periodically performing a first scan in said handset of said channels on said list to determine the presence of WTS control units having a system identification (SID) which matches the SID of the WTS in which said handset is registered, said handset remaining in WTS mode on the strongest of said WTS control channels found in said first scan;

(c) periodically performing a second scan of all CMTS channels which are also available to be used as WTS control channels to determine the presence of a WTS associated with said control channel, said handset remaining in WTS mode on the strongest of said WTS control channels associated with the WTS control unit having a SID which matches the SID of the WTS in which said handset is registered;

(d) transmitting a registration request from said handset on one or more of said WTS control channels found as a result of said second scan if no WTS control unit having a SID which matches the SID of the WTS in which said handset is registered is found during said second scan, said handset remaining in WTS mode on the strongest WTS control channel associated with the WTS control unit which accepts said registration request; and (e) switching said handset to operate in said CMTS mode if said registration request is denied by each WTS located during said second scan.

11. The method of claim 10 wherein said first scan is performed more frequently than said second scan.

12. The method of claim 10 wherein the step of transmitting said registration request along said WTS control channels is performed in the order of decreasing received signal strength of said WTS control channels, whereby a registration request is first sent along the strongest WTS control channel.

13. The method of claim 10 wherein a registration request is not transmitted to any WTS control unit which has previously denied registration requests by said telephone handset in said area.

\* \* \* \* \*